United States Patent
Butler, IV

(10) Patent No.: US 11,694,190 B2
(45) Date of Patent: Jul. 4, 2023

(54) PROVIDING PAYMENT ACCOUNT INFORMATION ASSOCIATED WITH A DIGITAL WALLET ACCOUNT TO A USER AT A MERCHANT POINT OF SALE DEVICE

(71) Applicant: Google LLC, Mountain View, CA (US)

(72) Inventor: Harry Lee Butler, IV, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 134 days.

(21) Appl. No.: 17/006,445

(22) Filed: Aug. 28, 2020

(65) Prior Publication Data
US 2020/0394645 A1 Dec. 17, 2020

Related U.S. Application Data

(63) Continuation of application No. 14/616,589, filed on Feb. 6, 2015, now Pat. No. 10,762,496.

(51) Int. Cl.
*G06Q 20/36* (2012.01)
*G06Q 20/34* (2012.01)
*G06Q 20/20* (2012.01)

(52) U.S. Cl.
CPC ......... *G06Q 20/367* (2013.01); *G06Q 20/204* (2013.01); *G06Q 20/209* (2013.01); *G06Q 20/3572* (2013.01)

(58) Field of Classification Search
CPC ... G06Q 20/204; G06Q 20/209; G06Q 20/367
See application file for complete search history.

(56) References Cited

U.S. PATENT DOCUMENTS 5,479,494 A 12/1995 Clitherow
6,636,833 B1 10/2003 Flitcroft et al.
(Continued)

FOREIGN PATENT DOCUMENTS

CA 2847086 9/2014

OTHER PUBLICATIONS

Constine, "CurrentC is the Big Retailers' Clunky Attempt to Kill Apple Pay and Cred Card Fees", Techcruch, http://techcruch.com/2014/10/25/currentc, retrieved on Oct. 25, 2014, 23 pages.

*Primary Examiner* — Ramsey Refai
(74) *Attorney, Agent, or Firm* — Dority & Manning, P.A.

(57) ABSTRACT

In an example embodiment, the user initiates a digital wallet transaction at a point of sale ("POS") terminal of a merchant system. The POS terminal receives payment account information options associated with the user's digital wallet account from the account management system to display to the user. The user selects one or more payment account information options via a user interface of the POS terminal. The account management system receives an indication of the user's one or more selections, generates one or more payment tokens based on the corresponding selected payment account information options, and transmits the one or more payment tokens to the POS terminal for use in a transaction. The POS terminal communicates with one or more issuer systems associated with the selected payment account information options to process the transaction using corresponding payment tokens. The user receives a transaction receipt at the POS terminal.

14 Claims, 9 Drawing Sheets

(56) References Cited

U.S. PATENT DOCUMENTS

| | | |
|---|---|---|
| 7,003,501 B2 | 2/2006 | Ostroff |
| 7,603,320 B1 | 10/2009 | Shu |
| 8,554,685 B2 | 10/2013 | Patterson et al. |
| 9,524,500 B2* | 12/2016 | Dave ................ G06Q 20/363 |
| 9,619,633 B1 | 4/2017 | Mortensen |
| 9,652,770 B1 | 5/2017 | Kurani et al. |
| 9,691,055 B2 | 6/2017 | von Behren et al. |
| 10,032,143 B2 | 7/2018 | Kim et al. |
| 10,438,196 B2 | 10/2019 | Liberty |
| 2001/0044787 A1 | 11/2001 | Shwartz et al. |
| 2002/0073027 A1 | 6/2002 | Hui et al. |
| 2002/0077978 A1* | 6/2002 | O'Leary ................ G06Q 20/10 |
| | | 705/40 |
| 2003/0135740 A1 | 7/2003 | Talmor et al. |
| 2003/0140004 A1* | 7/2003 | O'Leary .............. G06Q 20/102 |
| | | 705/40 |
| 2007/0162337 A1 | 7/2007 | Hawkins et al. |
| 2007/0288320 A1 | 12/2007 | Cooper et al. |
| 2008/0017704 A1 | 1/2008 | VanDeburg et al. |
| 2008/0046366 A1 | 2/2008 | Bemmel et al. |
| 2011/0153437 A1 | 6/2011 | Archer et al. |
| 2012/0296741 A1 | 11/2012 | Dykes |
| 2012/0310826 A1 | 12/2012 | Chatterjee |
| 2013/0036048 A1 | 2/2013 | Campos et al. |
| 2013/0103560 A1 | 4/2013 | Stone et al. |
| 2013/0325569 A1* | 12/2013 | Holmes .............. G06Q 30/0251 |
| | | 705/14.57 |
| 2013/0346302 A1 | 12/2013 | Purves et al. |
| 2013/0346305 A1 | 12/2013 | Mendes |
| 2014/0019352 A1 | 1/2014 | Shrivastava |
| 2014/0040126 A1 | 2/2014 | Andrews |
| 2014/0084059 A1 | 3/2014 | Sierchio et al. |
| 2014/0129435 A1 | 5/2014 | Pardo et al. |
| 2014/0164254 A1* | 6/2014 | Dimmick ................ G06Q 20/36 |
| | | 705/44 |
| 2014/0244462 A1* | 8/2014 | Maenpaa ............ G06Q 20/047 |
| | | 705/35 |
| 2014/0279474 A1 | 9/2014 | Evans et al. |
| 2015/0100486 A1 | 4/2015 | Green et al. |
| 2015/0149308 A1 | 5/2015 | Lin |
| 2015/0317626 A1 | 11/2015 | Ran et al. |
| 2015/0356551 A1 | 12/2015 | Dogin et al. |
| 2016/0026999 A1 | 1/2016 | Kurian |
| 2016/0196550 A1 | 7/2016 | Basit |
| 2016/0364723 A1 | 12/2016 | Reese et al. |
| 2017/0154329 A1 | 6/2017 | Babu et al. |

* cited by examiner

270

Communicating with an issuer system to process a transaction using a payment token

810
POS terminal transmits payment token and payment authorization request to issuer system 820
Issuer system receives payment token and payment authorization request 830
Issuer system identifies payment account associated with payment token 840
Payment approved?

850
POS terminal receives notice of declined payment transaction

860
Issuer system transmits notice of authorized payment transaction to POS terminal 870
POS terminal processes transaction and generates transaction receipt 280, Fig. 2

PROVIDING PAYMENT ACCOUNT INFORMATION ASSOCIATED WITH A DIGITAL WALLET ACCOUNT TO A USER AT A MERCHANT POINT OF SALE DEVICE

PRIORITY CLAIM

The present application is a continuation of U.S. application Ser. No. 14/616,589 having a filing date of Feb. 6, 2015. Applicant claims priority to and the benefit of each of such applications and incorporate all such applications herein by reference in its entirety.

TECHNICAL FIELD

The present disclosure relates to improving user convenience in digital wallet transactions by providing payment account information of the user's digital wallet account to a merchant point of sale device for user selection.

BACKGROUND

Digital wallet account services enable a user to electronically store payment information in a user's digital wallet account. In payment transactions involving a digital wallet account, the payment information is often stored on an application or a module of a user computing device. Often, a user must have the user computing device present when conducting in-store digital wallet transactions with a point of sale device because the payment information is communicated from the user computing device to the point of sale device. For example, the user computing device and point of sale device may establish a wireless communication channel, such as a Bluetooth, Wi-Fi, or NFC communication channel to transmit payment information from the user computing device to the point of sale device. However, such a process may be inconvenient to the user because the user must physically carry a user computing device, such as a mobile phone, to conduct a digital wallet transaction, which may deter users from using digital wallet accounts. Current technology does not provide for providing direct access to payment account information associated with a user's digital wallet account at a merchant system point of sale device interface for selection by a user for use in a transaction at the point of sale device.

SUMMARY

Techniques herein provide computer-implemented methods to provide access to payment account information associated with a user's digital wallet account to the user at a merchant system point of sale interface for use in a transaction. The user initiates a digital wallet transaction at a point of sale ("POS") terminal of a merchant system and verifies the user's identity at the point of sale terminal. The POS terminal receives payment account information options associated with the user's digital wallet account from the account management system and displays the payment account information options to the user. The user selects one or more payment account information options via a POS terminal user interface. The account management system receives an indication of the user selection of the one or more payment account information options from the POS terminal, generates one or more payment tokens based on the corresponding selected payment account information options, and transmits the payment token to the POS terminal for use in a transaction. The point of sale terminal communicates with one or more issuer systems associated with the selected payment account information options to process the transaction using the one o more corresponding payment tokens. The user receives a transaction receipt at the POS terminal.

In certain other example aspects described herein, systems and a computer program products to provide access to payment account information associated with a user's digital wallet account to the user at a merchant system point of sale interface for use in a transaction are provided.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 8 is a block flow diagram depicting a method for communicating with an issuer system to process a transaction using a payment token, in accordance with certain example embodiments.

DETAILED DESCRIPTION OF EXAMPLE EMBODIMENTS

Overview

Figure 1:
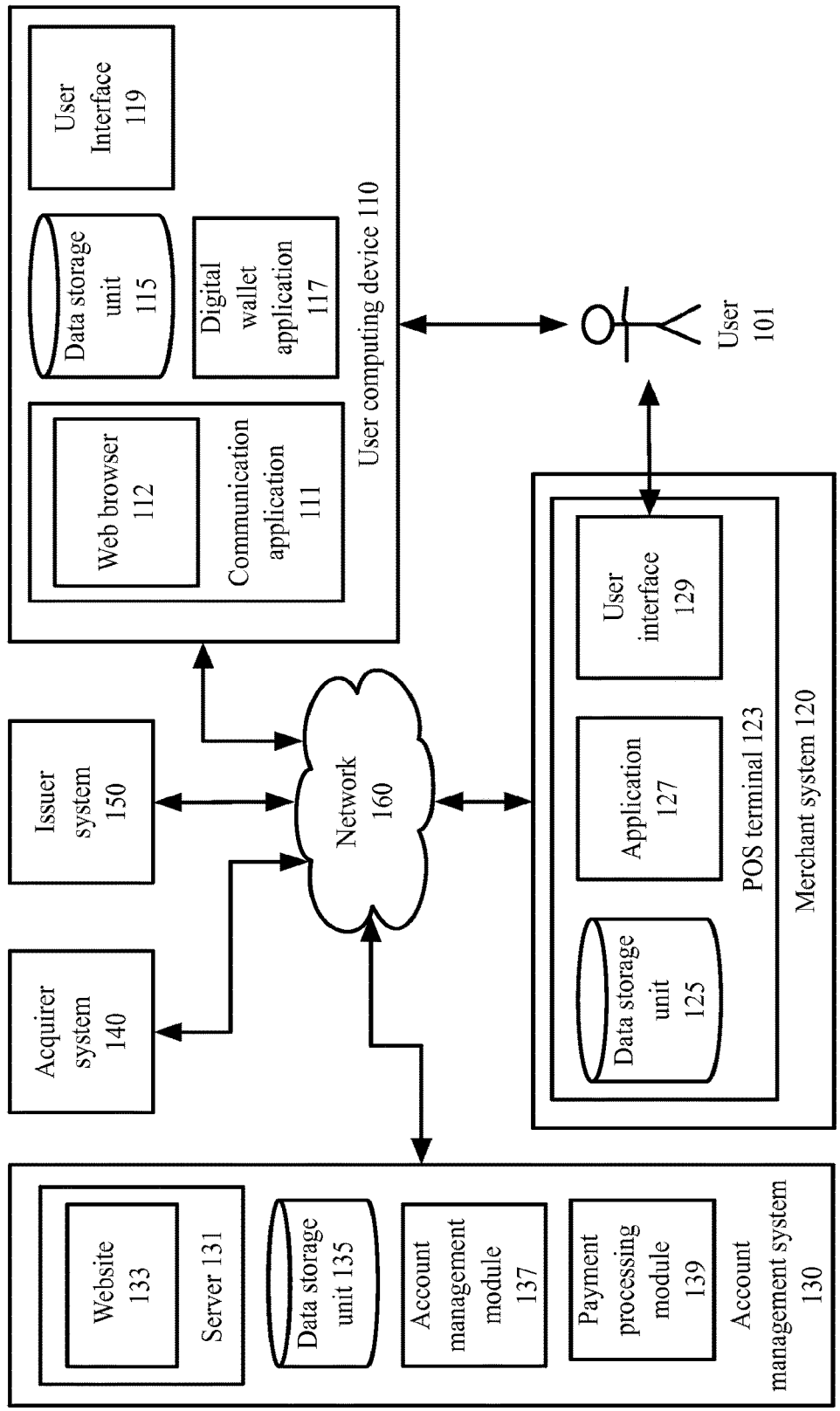
FIG. 1 is a block diagram depicting a system for providing digital wallet payment account information directly to a merchant system point of sale terminal for user selection, in accordance with certain example embodiments.

The example embodiments described herein provide computer-implemented techniques for providing access to payment account information associated with a user's digital wallet account to the user at a merchant system point of sale interface for use in a transaction. In an example embodiment, a user registers for a digital wallet account with an account management system. The user initiates a digital wallet transaction at a point of sale terminal of a merchant system and verifies the user's identity at the point of sale terminal. The point of sale terminal receives payment account information options associated with the user's digital wallet account from the account management system and displays the payment account information options to the user. The user selects a payment account information option via the point of sale user interface. The account management system receives an indication of the user selection of the payment account information option from the point of sale terminal, generates a payment token based on the selected payment account information, and transmits the payment token to the point of sale terminal for use in a transaction. The point of sale terminal communicates with an issuer system associated with the payment account information to process the transaction using the payment token. The user receives a transaction receipt at the point of sale terminal.

In an example embodiment, a user registers for a digital wallet account with an account management system. For example, the user accesses an account management system website from a user computing device to establish the digital wallet account via the website. In an example, a digital wallet application is downloaded from the account management system website onto a user computing device associated with the user. The user transmits payment account information to enter into the digital wallet account via the digital wallet application. For example, the user transmits payment account information corresponding to one or more credit accounts, debit accounts, bank accounts, coupons, offers, rewards points accounts, loyalty card accounts, or other applicable accounts. For example, for a credit account, the user enters the credit card number associated with the credit account, the expiration date of the credit card, a CVC number, a name associated with the account, and/or a zip code associated with the account. In another example, for a coupon, the user enters a coupon code associated with the coupon or otherwise captures an image of a barcode associated with the coupon via the user computing device. The account management system receives the user payment account information and saves the user payment account information in the digital wallet account associated with the user.

In an example embodiment, a user enters a merchant system location, selects one or more items for sale, and approaches a merchant system point of sale terminal to check out. The point of sale terminal presents the user with one or more payment options comprising an option to check out using a digital wallet account. For example, the point of sale terminal presents the user with the options to pay via digital wallet account, debit card, credit card, bank account, cash, check, store account, or any other relevant or appropriate payment option for use in an in-store transaction between the user and the merchant system. The user selects an option to check out using the user's digital wallet account and the point of sale terminal displays a request for user identification. The user enters user identification via the user interface at the point of sale terminal. In an example embodiment, the user identification information enables the account management system and/or the merchant system to identify the user's name and/or the user's digital wallet account. For example, the user identification information may comprise a user's first and last name, a user name associated with the user's digital wallet account, a digital wallet account number, or other relevant user identification information. In another example, the user identification information comprises biometric data that the user submits via the point of sale terminal, such as a fingerprint, retinal scan, or a voice recording. The point of sale system transmits the received user identification information to the account management system along with a payment information request.

In an example embodiment, the account management system receives the user identification information and the payment information request. The account management system identifies and accesses the user's digital wallet account using the received identification information. In an example embodiment, the account management system transmits a request for user verification information to the point of sale terminal to be displayed to the user. The point of sale terminal displays the request and the user provides verification information to the point of sale terminal. In an example, verification information comprises a PIN, a password, the selection of a particular image out of a group of images comprising at least the particular image, a fingerprint, a retinal scan, a voice input, and/or any other input of the user that can be used by the account management system to verify the identity of the user associated with the user identification information and/or the user's digital wallet account. In an example embodiment, the account management system receives the user verification information at the time the user registers for a digital wallet account and associates the user verification information with the digital wallet account. In this example embodiment, the account management system verifies the user verification information received from the point of sale terminal against the user verification information associated with the digital wallet account. If the received verification information is invalid, the account management system subsequently requests user verification information via the point of sale terminal or cancels the transaction. If the received verification information is valid, the account management system transmits payment information options associated with the user's digital wallet account to the point of sale terminal.

In an example embodiment, the point of sale terminal receives and displays the payment information options. In an example, the payment information options received and/or displayed by the point of sale terminal are incomplete and/or obfuscated. For example, payment account information associated with a user comprises an account type and number, Issuer A Credit 8800-0077-6600-0055, but the payment information option received by the point of sale terminal and/or displayed to the user reads "Issuer A Credit xxxx-xxxx-xxxx-0055", only comprising the issuer name associated with the account (Issuer A), the account type (Credit), and the last four digits of the account number (0055). In an example embodiment, the user selects a particular payment information option from available payment information options associated with the user's digital wallet account via the user interface of the point of sale terminal. In another example embodiment, the user selects two or more payment information options from the available payment information options. For example, the user may select a credit account payment information option, a coupon payment information option, and a rewards points payment information option to use in the transaction. The point of sale terminal communicates an indication of the user's one or more selections of the payment information option(s) to the account management system.

In an example embodiment, the account management system receives the indication of the user selection of the payment information option and generates a payment token based on the payment account information associated with the payment information option selected by the user. An example payment token comprises information that enables an issuer system to identify a user payment account associated with the issuer system and process a payment authorization request received from the point of sale terminal associated with a transaction involving the user payment account. For example, the payment token may comprise an actual account number or a virtual account number that the issuer system can use to find the actual account number in a database of the issuer system. The account management system transmits the payment token to the point of sale terminal.

The point of sale terminal communicates with the issuer system to process the transaction using the payment token. In an example embodiment, the issuer system comprises a credit card issuer, a bank or financial institution system, a coupon issuer, an advertiser, or other system with whom the user has an account or with whom the merchant may expect reimbursement for part or all of the value of the transaction initiated by the user at the point of sale terminal. In an example embodiment, the point of sale terminal communicates with two or more issuer systems to process the transaction using two or more payment tokens. For example, the point of sale terminal receives a first payment token associated with a coupon and a second payment token associated with a credit card account. In this example, the point of sale system first communicates with a coupon issuer system to process the coupon using the first payment token, discounts the value of the coupon from the transaction, then communicates with a credit card issuer system to process a second transaction for the value of the user's outstanding balance. An example issuer system receives the payment token, identifies a user payment account or other applicable account based on the payment token, and approves or denies the payment authorization request. The point of sale terminal prints a receipt at the point of sale terminal or otherwise transmits the receipt to the user.

By using and relying on the methods and systems described herein, the account management system and the merchant system point of sale device enable the user to select payment account information associated with the user's digital wallet account directly at the point of sale terminal for use in a transaction. Additionally, by enabling the point of sale terminal to receive user payment account information options associated with the user's digital wallet account from the account management system to display to the user to select for use in a transaction, the user does not have to produce a physical digital wallet payment card or a user computing device at the point of sale terminal. As such, the systems and methods described herein may provide a convenience to the user.

Example System Architecture

Turning now to the drawings, in which like numerals indicate like (but not necessarily identical) elements throughout the figures, example embodiments are described in detail.

FIG. 1 is a block diagram depicting a system 100 for providing digital wallet payment account information directly to a merchant system POS terminal for user selection, in accordance with certain example embodiments. As depicted in FIG. 1, the system 100 includes network computing devices/systems 110, 120, 130, 140, and 150 that are configured to communicate with one another via one or more networks 160. In some embodiments, a user associated with a device must install an application and/or make a feature selection to obtain the benefits of the techniques described herein.

In example embodiments, the network 160 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 120, 130, 140, and 150 includes a device having a communication module capable of transmitting and receiving data over the network 160. For example, each network computing device 110, 120, 130, 140, and 150 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, 130, 140, and 150 are operated by users 101, merchant system 120 operators, account management system 130 operators, acquirer system 140 operators, and issuer system 150 operators, respectively.

An example user computing device 110 comprises a communication application 111, a web browser 112, a data storage unit 115, a digital wallet application 117, and a user interface 119.

In an example embodiment, the user 101 can use a communication application 111, such as a web browser 112 application or a stand-alone application, to view, download, upload, or otherwise access documents or web pages via a distributed network 160. In an example embodiment, the communication application 111 can interact with web servers or other computing devices connected to the network 160, including the user computing device 110 and a web server 131 of a merchant system 130.

In an example embodiment, the web browser 112 can enable the user 101 to interact with web pages using the user computing device 110. In an example embodiment, the user 101 may access a website 133 of the account management system 130 to establish a digital wallet account with the account management system 130 via the web browser 112. In an example embodiment, the user 101 may access the user's 101 digital wallet account maintained by the account management system 130 via the web browser 112. In another example embodiment, the user 101 may enter payment information into the user's 101 digital wallet account via the web browser 112. In certain example embodiments described herein, one or more functions performed by the digital wallet application 117 may also be performed by a web browser 112 application associated with the account management system 130.

In an example embodiment, the data storage unit 115 comprises a local or remote data storage structure accessible to the user computing device 110 suitable for storing information. In an example embodiment, the data storage unit 115 stores encrypted information, such as HTML5 local storage. In an example embodiment, the data storage unit 115 resides within a secure element (not depicted).

In an example embodiment, the digital wallet application 117 is a program, function, routine, applet, or similar entity that exists on and performs its operations on the user computing device 110. In certain embodiments, the user 101 must install the digital wallet application 117 and/or make a feature selection on the user computing device 110 to obtain the benefits of the techniques described herein. In an example embodiment, the digital wallet application 117 communicates with the account management system 130. In an example embodiment, a user 101 downloads the digital wallet application 117 from an account management system website 133 onto a user computing device 110. In an example embodiment, a user 101 may access the user's 101 digital wallet account, add new payment account information to the digital wallet account, edit payment account information in the digital wallet account, or delete existing payment account information from the digital wallet account via the digital wallet application 117.

In certain example embodiments described herein, one or more functions performed by the digital wallet application 117 resident on the user computing device 110 may also be performed by a web browser 112 application associated with the account management system 130. In certain example embodiments described herein, one or more functions performed by the account management system 130 may also be performed by the digital wallet application 117. In certain example embodiments described herein, one or more functions performed by the web browser 112 application associated with the account management system 130 may also be performed by the digital wallet application 117.

In certain example embodiments described herein, the digital wallet application 117 maintains periodic or constant communication with the account management system 130 via the network 160. In certain example embodiments, the digital wallet application 117 and is able to send and receive data associated with the user's 101 digital wallet account to and from the account management system 130 when appropriate. For example, the digital wallet application 117 may communicate user 101 interactions with the digital wallet application 117 via the user interface 119 to the account management system 130, such as a user 101 selection of an option to add a payment account information. In this example, the digital wallet application 117 may communicate financial account information entered by the user 101 on the user computing device 110 to the account management system 130 for saving in the user's 101 digital wallet account.

In an example embodiment, the user interface 119 may be a touch screen, a voice-based interface or any other interface that allows the user 101 to provide input and receive output from an application or module on the user computing device 110. In an example embodiment, the user interface 119 enables the user 101 to interact with the digital wallet application 117 or a web browser 112 application associated with the account management system 130. For example, the user 101 may actuate one or more objects on the user interface 119 to instruct the digital wallet application 117 and/or web browser 112 application to add, edit, or delete payment account information to/from the user's 101 digital wallet account.

In certain example embodiments, at a time after a user 101 selects an option to check out using a digital wallet account via the merchant POS terminal user interface 129, the merchant POS terminal 123 may establish a wireless communication channel with a user computing device 110 of the user 110 to receive a hardware identifier associated with the user computing device 110 for user 101 identification purposes. In this example embodiment, the user 101 operating the user computing device 110 may select an option on the user interface 119 to allow the wireless communication channel to be established. For example, the user 101 views a request on the user computing device 110 that says "do you wish to establish a wireless connection with Merchant A?" and selects an object on the user interface 119 that says "yes, I wish to establish a wireless connection with Merchant A."

An example merchant system 120 comprises a point of sale ("POS") terminal 123, an example POS terminal 123 comprising a data storage unit 125, an application 127, and a user interface 129.

In an example embodiment, the merchant system 120 comprises one or more POS terminals 123 at one or more physical locations of the merchant system 120. For example, the merchant system 120 is a supermarket chain and comprises several physical locations, each location comprising one or more POS terminals 123.

An example merchant system 120 comprises at least one point of sale ("POS") terminal 123 that is capable of processing a purchase transaction initiated by a user for example, a cash register. In an example embodiment, the merchant operates a commercial store and the user indicates a desire to make a purchase by presenting a form of payment at the POS terminal 123. In certain example embodiments, the POS terminal 123 communicates directly with the account management system 130, enabling the user 101 to directly select payment account information options from the user's 101 digital wallet account from the POS terminal user interface 129. In an example embodiment, the POS terminal 123 operates as a normal POS device, and the user 101 and/or a merchant system operator is able to scan or enter one or more items that the user desires to purchase.

An example data storage unit 125 residing on the POS terminal 123 comprises a local or remote data storage structure accessible to the POS terminal 123 suitable for storing information. In an example embodiment, the data storage unit 125 stores encrypted information, such as HTML5 local storage. In an example embodiment, the data storage unit 125 resides within a secure element (not depicted) in the POS terminal 123.

An example POS terminal application 127 comprises a program, function, routine, applet, or similar entity that exists on and performs its operations on the POS terminal 123. In certain embodiments, the merchant system 130 operator must install the application 127 to obtain the benefits of the techniques described herein. In an example embodiment, the POS terminal application 127 instructs the user interface 129 to present the user 101 with one or more payment options for a transaction. In an example embodiment, the POS terminal application 127 receives an indication of a selection of a particular payment option of the one or more payment options from the user interface 129. For example, the POS terminal application 127 receives an indication that the user 101 selected an option on the user interface 129 to initiate a digital wallet transaction using a digital wallet account associated with the account management system 130. In an example embodiment, the POS terminal application 127 instructs the user interface 129 to display a request for the user to enter user 101 identification information. In this example embodiment, the POS terminal application 127 receives user 101 identification information entered by the user 101 at the user interface 129. In another example embodiment, instead of instructing the user interface 129 to display a request for the user 101 identification information, the POS terminal application 127 instructs the POS terminal 123 to establish a wireless communication channel with a user computing device 110 to receive user 101 identification information comprising a hardware identifier of the user computing device 110.

In an example embodiment, the POS terminal application 127 transmits a payment information request and the identification information to the account management system 130. In an example embodiment, the POS terminal application 127 receives, from the account management system 130, a request for the user 101 to transmit user 101 verification information. In an example embodiment, the POS terminal application 127 instructs the user interface 129 to display a request for user 101 verification information to the user 101. In this example embodiment, the POS terminal application 127 receives user 101 verification information entered by the user 101 at the user interface 129. In an example embodiment, the POS terminal application 127 transmits the user 101 verification information to the account management system 130. In an example embodiment, the POS terminal application 127 receives one or more payment account information options from the account management system 130. In an example embodiment, the POS terminal application 127 instructs the user interface 129 to display the one or more received payment account information options to the user 101. In an example embodiment, the POS terminal application 127 receives an indication from the user interface 129 of a user 101 selection of one or more displayed payment account information options. In an example embodiment, the POS terminal application 127 transmits the indication of the user 101 selection of the one or more payment account information options to the account management system 130.

In an example embodiment, the POS terminal application 127 receives, from the account management system 130, one or more payment tokens generated by the account management system 130 corresponding to the one or more user 101 selected payment account information options. In an example embodiment, the POS terminal application 127, for each received payment token, communicates with an issuer system 150 associated with the payment account information associated with the payment token to process a transaction using the payment token. For example, the POS terminal application 127 may communicate with one or more credit card issuer systems 150, coupon issuer systems 150, bank issuer systems 150, or other appropriate issuer systems 150. In an example embodiment, for each issuer system 150 with which the POS terminal application 127 communicates to process a transaction, the POS terminal application 127 receives a notice of an approved or declined payment transaction. In an example embodiment, the POS terminal application 127 instructs the POS terminal 123 to print or send a transaction receipt based on the receipt of the one or more notices of an approved or declined payment transactions associated with the user 101 initiated transaction.

An example user interface 129 may be a touch screen, a voice-based interface or any other interface that allows the user 101 to provide input and receive output from an application or module on the POS terminal 123. In an example embodiment, the user interface 129 enables the user 101 to select, from a plurality of displayed payment options, an option to check out using a digital wallet account associated with the account management system 130. In an example embodiment, the user interface 129 displays a request for user 101 identification information and enables the user 101 to enter the user 101 identification information into the POS terminal 123. In an example embodiment, the user interface 129 displays a request for user 101 verification information and enables the user 101 to enter the user 101 verification information into the POS terminal 123. For example, the user interface 129 may comprise a touch screen keyboard, an external keyboard, a fingerprint scanner, a voice recorder, a retinal scanner, or other appropriate or relevant hardware to receive a user 101 input of user 101 identification information and/or user 101 verification information.

In an example embodiment, the user interface 129 displays one or more payment account information options received by the POS terminal 123 from the account management system 130 and enables the user 101 to select one or more of the displayed payment account information options for use in the user 101 initiated transaction. In an example embodiment, the user interface 129 communicates with the POS terminal application 127. For example, the user interface 129 receives instructions to display requests or display options to select from the POS terminal application 127. In another example, the user interface 129 communicates an indication of one or more user 101 selections made via the user interface 129.

An example account management system 130 comprises a server 131, a website 133, a data storage unit 135, an account management module 137, and a payment processing module 139.

In an example embodiment, the server 131 provides the content accessible by the user 101 through the web browser 112 and/or digital wallet application 117 resident on the user computing device 110, including but not limited to html documents, images, style sheets, and scripts. In an example embodiment, the server 151 supports the account management system website 133.

In an example embodiment, the website 133 is a means by which the user 101 establishes a digital wallet account with the account management system 130. In an example embodiment, the user 101 adds, edits, or deletes payment account information from a digital wallet account associated with the account management system 130 via the website 133. In an example embodiment, the user 101 accesses the website 133 via the web browser 112. In another example embodiment, the user 101 accesses the website 133 via digital wallet application 117 resident on the user computing device 110.

In an example embodiment, the data storage unit 135 comprises a local or remote data storage structure accessible to the payment card device 120 suitable for storing information. In an example embodiment, the data storage unit 123 stores encrypted information, such as HTML5 local storage. In an example embodiment, the data storage unit 123 resides within a secure element 124. In an example embodiment, the data storage unit 135 stores information associated with a user's 101 digital wallet account. For example, the data storage unit 135 may store payment account information, user 101 identification information, or user 101 verification information associated with the user's 101 digital wallet account.

In an example embodiment, the account management module 137 receives payment account information from the user computing device 110 that the user 101 desires to enter into the user's 101 digital wallet account. In an example embodiment, the account management module 137 may save received payment account information in the data storage unit 135. In an example embodiment, the account management system 137 may edit or delete existing payment account information from the user's 101 digital wallet account in response to receiving user 101 instructions from the digital wallet application 117 or user computing device 110 to edit or delete payment account information.

In an example embodiment, the payment processing module 139 receives a request from the POS terminal 123 for payment account information to use in a user 101 initiated transaction. In an example embodiment, the payment processing module 139 receives user 101 identification information from the POS terminal 123. In an example embodiment, the payment processing module 139 and/or the account management module 137 identify the user's 101 digital wallet account based on the received user 101 identification information. In an example embodiment, the payment processing module 139 requests user 101 verification information from the POS terminal 123. In an example embodiment, the payment processing module 139 receives user 101 verification information from the POS terminal 123. In an example embodiment, the payment processing module 139 and/or account management module 137 verifies the validity of the user 101 verification information.

In an example embodiment, the payment processing module 139 transmits, to the POS terminal 123, one or more payment account information options to the POS terminal 123 for display to the user 101. In this example embodiment, the payment processing module 139 may obfuscate, occlude, or delete portions of individual payment account information to produce corresponding individual payment account information options. In an example embodiment, the payment processing module 139 receives an indication of a user 101 selection of one or more payment account information options from the POS terminal 123. In an example embodiment, the payment processing module 139 generates, for each received selection of a payment account information option, a payment token that may be used by the POS terminal 123 to process a transaction with an appropriate issuer system 150. In an example embodiment, the payment processing module transmits the one or more generated payment tokens to the POS terminal 123.

In an example embodiment, an acquirer system 140 may communicate with an issuer system 150 to approve a credit authorization and to make payment to the merchant system 120. For example, the acquirer is a third party payment processing company.

An example issuer system 150 is the issuer of payment account information associated with a user's 101 digital wallet account. For example, the issuer system 150 may be a credit card issuer, a coupon issuer, a voucher issuer, a bank account issuer, a merchant system 120 account issuer, or other account issuer. In an example embodiment, the POS terminal 123 communicates with one or more issuer systems 150 to process a user initiated transaction using one or more corresponding payment tokens generated by the account management system 130. In an example embodiment, the issuer system 150 receives the payment token and a payment authorization request. In an example embodiment, the issuer system 150 identifies a payment account based on the payment token and approves or declines the payment authorization request. In an example embodiment, the issuer system 150 communicates a notice of approval or denial of the payment authorization request to the POS terminal 123.

It will be appreciated that the network connections shown are example and other means of establishing a communications link between the computers and devices can be used. Moreover, those having ordinary skill in the art having the benefit of the present disclosure will appreciate that the user computing device 110, the merchant system 120, the account management system 130, the acquirer system 140, and the issuer system 150 illustrated in FIG. 1 can have any of several other suitable computer system configurations. For example, a user computing device 110 embodied as a mobile phone or handheld computer may or may not include all the components described above.

In example embodiments, the network computing devices and any other computing machines associated with the technology presented herein may be any type of computing machine such as, but not limited to, those discussed in more detail with respect to FIG. 11. Furthermore, any modules associated with any of these computing machines, such as modules described herein or any other modules (scripts, web content, software, firmware, or hardware) associated with the technology presented herein may by any of the modules discussed in more detail with respect to FIG. 9. The computing machines discussed herein may communicate with one another as well as other computer machines or communication systems over one or more networks, such as network 160. The network 160 may include any type of data or communications network, including any of the network technology discussed with respect to FIG. 9.

Example Processes

The example methods illustrated in FIGS. 2-8 are described hereinafter with respect to the components of the example operating environment 100. The example methods of FIGS. 2-8 may also be performed with other systems and in other environments.

Figure 2:
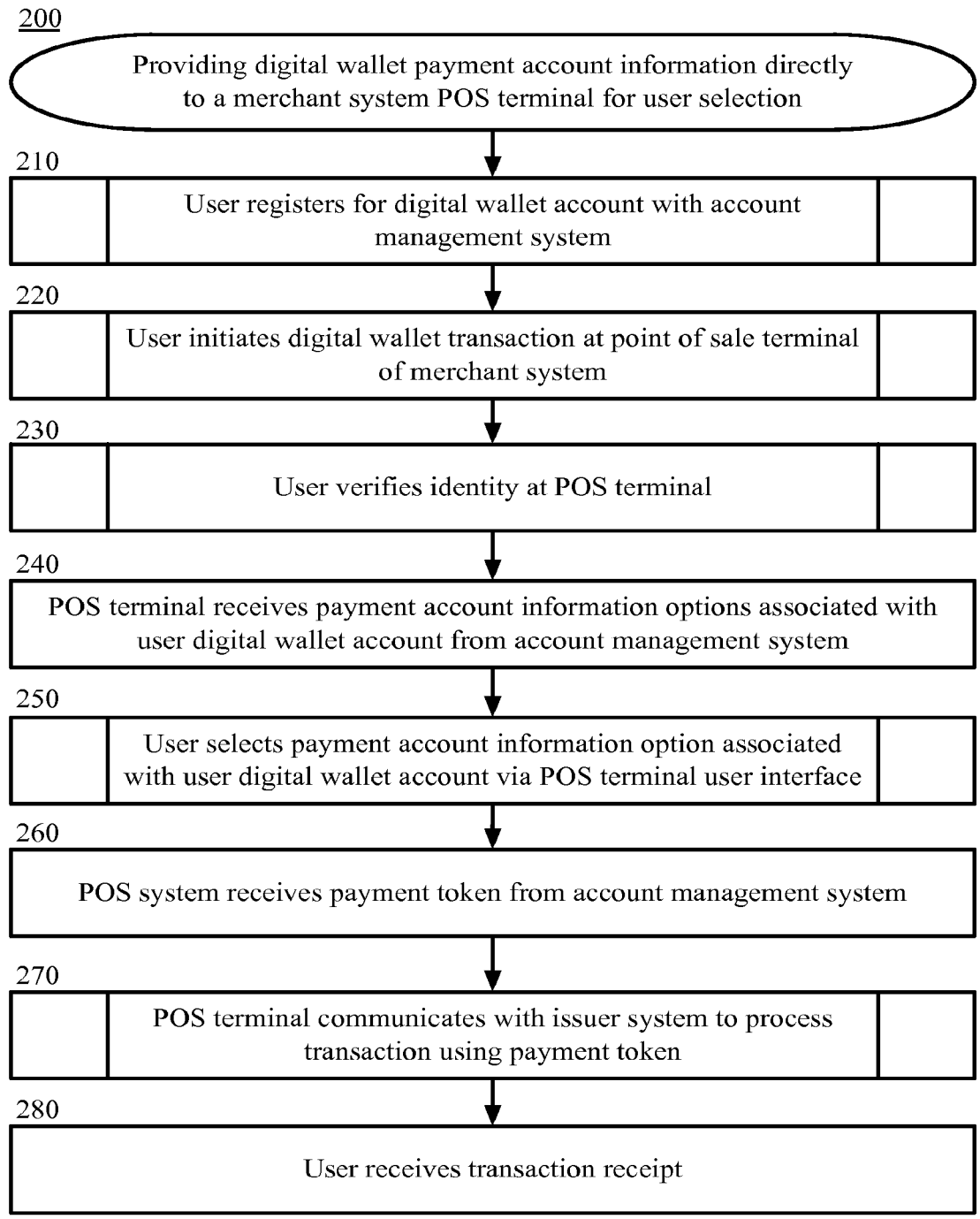
FIG. 2 is a block flow diagram depicting a method for providing digital wallet payment account information directly to a merchant system point of sale terminal for user selection, in accordance with certain example embodiments.

FIG. 2 is a block diagram depicting a method 200 for providing digital wallet payment account information directly to a merchant system POS terminal 123 for user 101 selection, in accordance with certain example embodiments. The method 200 is described with reference to the components illustrated in FIG. 1.

In block 210, a user 101 registers for a digital wallet account with an account management system 130.

Figure 3:
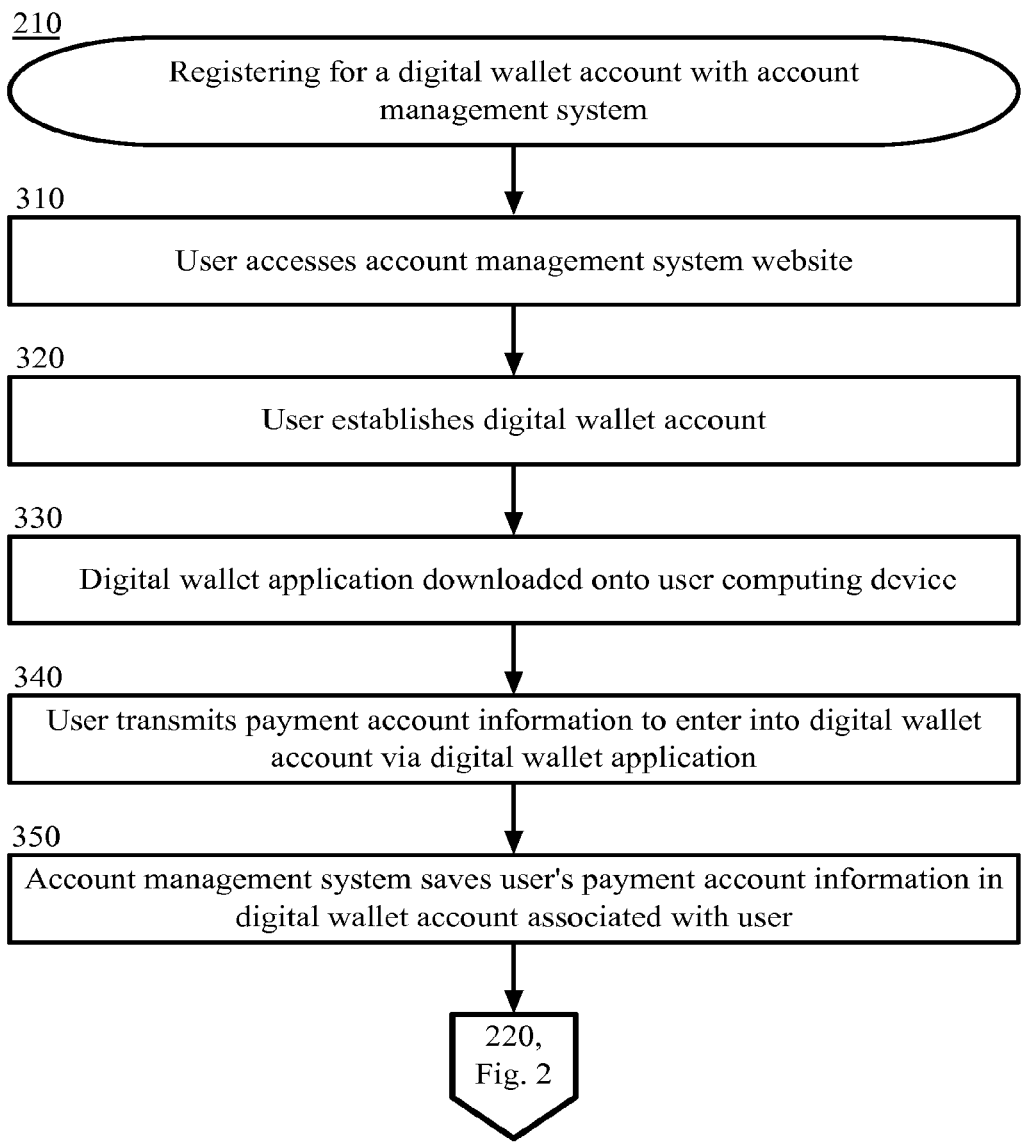
FIG. 3 is a block flow diagram depicting a method for registering for a digital wallet account with an account management system, in accordance with certain example embodiments.

FIG. 3 is a block diagram depicting a method 210 for registering for a digital wallet account with an account management system 130, in accordance with certain example embodiments. The method 210 is described with reference to the components illustrated in FIG. 1.

In block 310, the user 101 accesses an account management system website 133. In an example embodiment, the user 101 accesses the account management system website 133 via the web browser 112 of the user computing device 110. For example, the user 101 enters the website 133 address in the address bar of the web browser 112 to access the website 133. In another example embodiment, the user 101 accesses the account management system website 133 using an application resident on the user computing device 110. For example, the user 101 selects an application on the user computing device 110 that connects the user 101 to the account management system website 133.

In block 320, the user 101 establishes a digital wallet account. In an example embodiment, the user 101 registers a username and a password associated with the user account to use to sign in to the user 101 digital wallet account. In an example embodiment, the user provides one or more user 101 identification information to the account management system 130 to associate with the digital wallet account. For example, the user 101 may provide a telephone number, an email address, a physical address, and/or other user 101 identification information. In an example embodiment, the account management system 130 associates the user 101 identification information with the user's 101 digital wallet account. In an example embodiment, the user 101 digital wallet account is associated with one or more services, such as an email service, a messaging service, a gaming service, or a mapping service, provided by the account management system 130.

In an example embodiment, when establishing the digital wallet account with the website 133, the user 101 provides user 101 verification information to the account management system 130. In this example embodiment, the account management system 130 associates the user 101 verification information with the user 101 digital wallet account. Example user 101 verification information comprises a password, a personal identification number ("PIN"), or a selection of a particular image from a plurality of images. In another example, verification information comprises user 101 biometric information, such as a fingerprint of the user 101, a retinal scan of the user 101, or a voice recording of the user 101. In an example embodiment, the account management system 130 saves the user 101 verification information in the data storage unit 135 and associates the user 101 verification information with the user 101 digital wallet account. In this example embodiment, the account management system 130 may verify the user's 101 identity by comparing received user 101 verification information to the saved user 101 verification information.

In block 330, a digital wallet application 117 is downloaded onto the user computing device 110. In an example embodiment, the digital wallet application 117 communicates with the account management system 130 over the network 160. In this example, the digital wallet payment application 113 communicates with the account management system 130, which administers the user 101 digital wallet account. In another example embodiment, the user 101 may download various applications associated with the user account from the payment processing system 120 in addition to the digital wallet application 117. For example, the user 101 downloads one or more of an email application, a mapping application, a social network application, or a search application associated with the account management system 130. In this example, the user 101 may maintain a universal username and/or password to access all the applications associated with the account management system 130. In another example embodiment, the digital wallet application 117 is downloaded onto the user computing device 110 before the user 101 establishes the user 101 digital wallet account with the account management system 130. In certain example embodiments, the user 101 does not download the digital wallet application 117 onto the user computing device 110. For example, the user 101 may access the digital wallet account using a web browser 112 application associated with the account management system 130 or may access the digital wallet account directly on the account management system website 133 using the web browser 112.

In block 340, the user 101 transmits payment account information to enter into the digital wallet account via the digital wallet application 117. In an example embodiment, the digital wallet application 117 communicates with the account management system 130. In another example embodiment, the user 101 enters the payment account information using the via the web browser 112, which communicates with the account management system 130. In an example embodiment, the payment account information entered by the user 101 is associated with one or more of a credit account, a debit account, a bank account, a coupon, a voucher, a rewards points account, a merchant system 120 account, or other account of the user 101, merchant system 120, or third party. In an example embodiment, each payment account is associated with a respective issuer system 150. For example, the credit account is associated with a credit card issuer system 150, the debit account and bank account are associated with a financial institution issuer system 150, the coupon is associated with a coupon issuer system 150, the rewards points account is associated with a rewards points account issuer system 150, and the merchant system 120 account is associated with the merchant system 120 acting as an issuer system 150. In an example embodiment, a credit account is associated with an issuer system 130 and an acquirer system 140.

In an example embodiment, payment account information for a respective bank account comprises an account number, a routing number, the name associated with the payment account, the address associated with the payment account and/or any other relevant, useful, or necessary information that the user 101 may enter into the user 101 digital wallet account or that the user digital wallet account may require or request from the user 101. In an example embodiment, the payment account information associated with a credit account or a debit account comprises a credit card or debit card number, an expiration date, a card verification number, the name associated with the credit account, and/or any other relevant, useful, or necessary information that the user 101 may enter into the user account or that the user 101 digital wallet account may require. In an example embodiment, the payment account information associated with a coupon comprises a coupon number, a barcode or QR code, an expiration date, a coupon issuer system 150 name, a product name, a redemption condition, and/or any other relevant, useful, or necessary information that the user 101 may enter into the user account or that the user 101 digital wallet account may require.

In certain example embodiments, to enter payment account information to the user 101 digital wallet account, the user may scan or capture images, using the user computing device 110 one or more payment instruments associated with one or more payment accounts and transmit the images and/or scans to the account management system. In these example embodiments, the account management system 130 receives the scans and/or images of the payment instruments and determines the payment information based on the scans and/or images. For example, the user 101 captures an image of a barcode of a coupon via a camera module on the user computing device 110 and transmits the image to the account management system 130 for entry into the user 101 digital wallet account. In this example, the account management system 130 receives the image of the barcode of the coupon from the user computing device 110 for entry into the user 101 digital wallet account. In this example, the account management system 130 determines the payment information associated with the coupon by interpreting the barcode in the received image.

In an example embodiment, the account management system 130 receives the payment account information of the user 101.

In block 350, the account management system 130 saves the user's payment account information in the digital wallet account associated with the user 101. In an example embodiment, the account management system 130 saves the user's payment account information in a database, table, or other record that correlates the user 101 identification information with the user 101 verification information and the payment account information associated with one or more payment accounts. In an example embodiment, the user 101 may access the digital wallet account via the digital wallet application 117 and/or web browser 112 to add, edit, and/or delete payment account information.

From block 350, the method 210 proceeds to block 220 of FIG. 2.

Returning to FIG. 2, in block 220, the user 101 initiates a digital wallet transaction at a POS terminal 123 of the merchant system 120.

Figure 4:
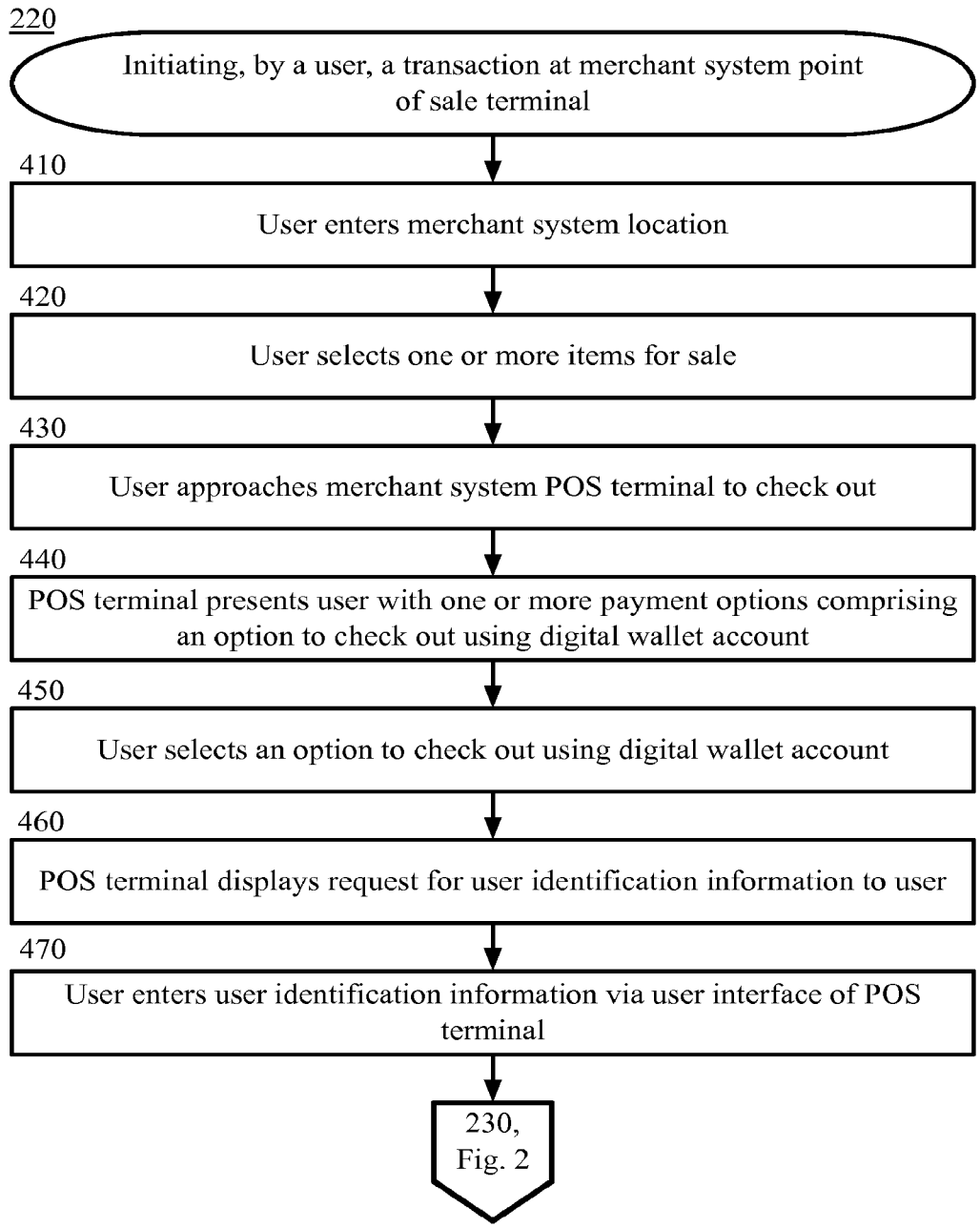
FIG. 4 is a block flow diagram depicting a method for initiating, by a user, a transaction at a merchant system point of sale terminal, in accordance with certain example embodiments.

FIG. 4 is a block diagram depicting a method 220 for initiating, by a user 101, a transaction at a merchant system point of sale terminal 123, in accordance with certain example embodiments. The method 220 is described with reference to the components illustrated in FIG. 1.

In block 410, the user 101 enters a merchant system 120 location. For example, a merchant system 120 comprises one or more physical locations at one or more respective physical street addresses.

In block 420, the user 101 selects one or more items for sale. For example, the user 101 enters the merchant system 120 location and selects one or more items from the merchant system 120 location's store shelves for purchase.

In block 430, the user 101 approaches a merchant system POS terminal 123 to check out. In an example embodiment, the POS terminal 123 is a self-checkout terminal. In another example embodiment, the POS terminal 123 is operated by an agent of the merchant system 120. In an example embodiment, the user 101 or the agent of the merchant system 120 scans and/or enters information associated with the one or more items into the POS terminal 123. For example, an agent of the merchant system 120 scans barcodes of all the user's 101 selected items using a barcode scanner of the POS terminal 123. In example embodiment, the POS terminal 123 calculates a total cost of transaction to purchase the one or more items and displays the total to the user 101 via the user interface 129.

In block 440, the POS terminal 123 presents the user 101 with one or more payment options comprising an option to check out using a digital wallet account. For example, the POS terminal 123 displays payment options comprising options for the user 101 to pay using cash, check, credit card, debit card, money order, coupon, merchant system 120 store credit account, rewards card, or other acceptable method of payment in addition to an option to check out using a digital wallet account. In an example embodiment, the POS terminal 123 displays, on the user interface 129, the one or more payment options represented by one or more objects on the user interface 129 selectable by the user 101. In an example embodiment, the POS terminal 123 displays an option to check out using a digital wallet account associated with a particular account management system 130. In another example embodiment, the POS terminal 123 displays one or more options to check out with one or more digital wallet accounts associated with one or more respective account management systems 130. For example, the POS terminal 123 displays a first option to check out using a digital wallet account associated with account management system A and a second option to check out using a digital wallet account associated with account management system B.

In block 450, the user 101 selects an option to check out using a digital wallet account. For example, the user 101 selects an object on the user interface 129 of the POS terminal 123 representing the option to check out using the digital wallet account. In another example, the user 101 directs an agent of the merchant system 120 operating the POS terminal 123 to select an option to check out using the digital wallet account.

In block 460, the POS terminal 123 displays a request for user 101 identification information to the user 101. In an example embodiment, the POS terminal 123 displays the request for user 101 identification information on the user interface 129. In an example embodiment, the POS terminal 123 is configured by the merchant system 120 and or the account management system 130 associated with the user's 101 digital wallet account to request user 101 identification information in response to receiving a selection from the user 101 of the option to check out using a digital wallet account. In another example embodiment, the POS terminal 123 communicates an indication to the account management system 130 of the user 101 selection of an option to check out using a digital wallet. In this example embodiment, the account management system 130 transmits a request for user 101 identification information, which the POS terminal 123 displays to the user 101 on the user interface 129.

In block 470, the user 101 enters user 101 identification information via the user interface 129 of the POS terminal 123. In an example embodiment, the user interface 129 comprises a touch screen interface and comprises a touch screen keyboard comprising alphanumeric characters and/or symbols that the user 101 may input by touching the screen. For example, the user 101 enters a username, telephone number, address, email address, and/or other user 101 identification information associated with the digital wallet account via the user interface 129. In another example embodiment, the user interface 129 comprises a fingerprint scanner, retinal scanner, or voice recorder wherein the user 101 submits user 101 identification information comprising a fingerprint, retinal scan, or voice recording to the POS terminal 123.

In certain other example embodiments, the user 101 identification information comprises a hardware identifier associated with a user computing device 110 in the user's 101 possession at the time of transaction. In an example embodiment, at a time after a user 101 selects an option to check out using a digital wallet account, the merchant POS terminal 123 establishes a wireless communication channel with a user computing device 110 of the user 110. For example, the wireless communication channel comprises a Bluetooth communication channel, a near field communication ("NFC") channel, or a Wi-Fi communication channel. For example, the user computing device 110 and the merchant POS terminal 123 periodically or continuously emit probe requests using a respective wireless communication protocol. In this example, a first device, either the user computing device 110 or the merchant POS terminal 123, detects the presence of the other device in a physical proximity conforming to the communication protocol. In this example, the first device transmits a request to establish a wireless communication channel to the other device, the other device receives the request, the other device transmits a confirmation response back to the first device, establishing a wireless communication channel. In this example embodiment, the user 101 operating the user computing device 110 must select an option on the user interface 119 to allow the wireless communication channel to be established. For example, the user 101 views a request on the user computing device 110 that says "do you wish to establish a wireless connection with Merchant A?" and selects an object on the user interface 119 that says "yes, I wish to establish a wireless connection with Merchant A." In an example embodiment, after establishing a wireless communication channel, the user computing device 110 and POS terminal 123 may exchange cryptographic keys to enable cryptographic communication via a secure wireless communication channel. In an example embodiment, the POS terminal 123 transmits a request to the user computing device 110, via the wireless communication channel, for a user computing device 110 hardware identifier. In this example embodiment, the user computing device 110 transmits the hardware identifier to the POS terminal 123 in response to receiving the request. An example hardware identifier comprises a MAC address, a serial number, or other identifier associated with the user computing device 110.

From block 470, the method 220 proceeds to block 230 in FIG. 2.

Returning to FIG. 2, in block 230, the user 101 verifies his identity at the POS terminal 123. In other example embodiments, the user 101 is not required to verify his or her identify in a separate step because the user 101 identification information transmitted by the user 101 to the merchant system POS terminal 123 comprises or further comprises user 101 verification information.

Figure 5:
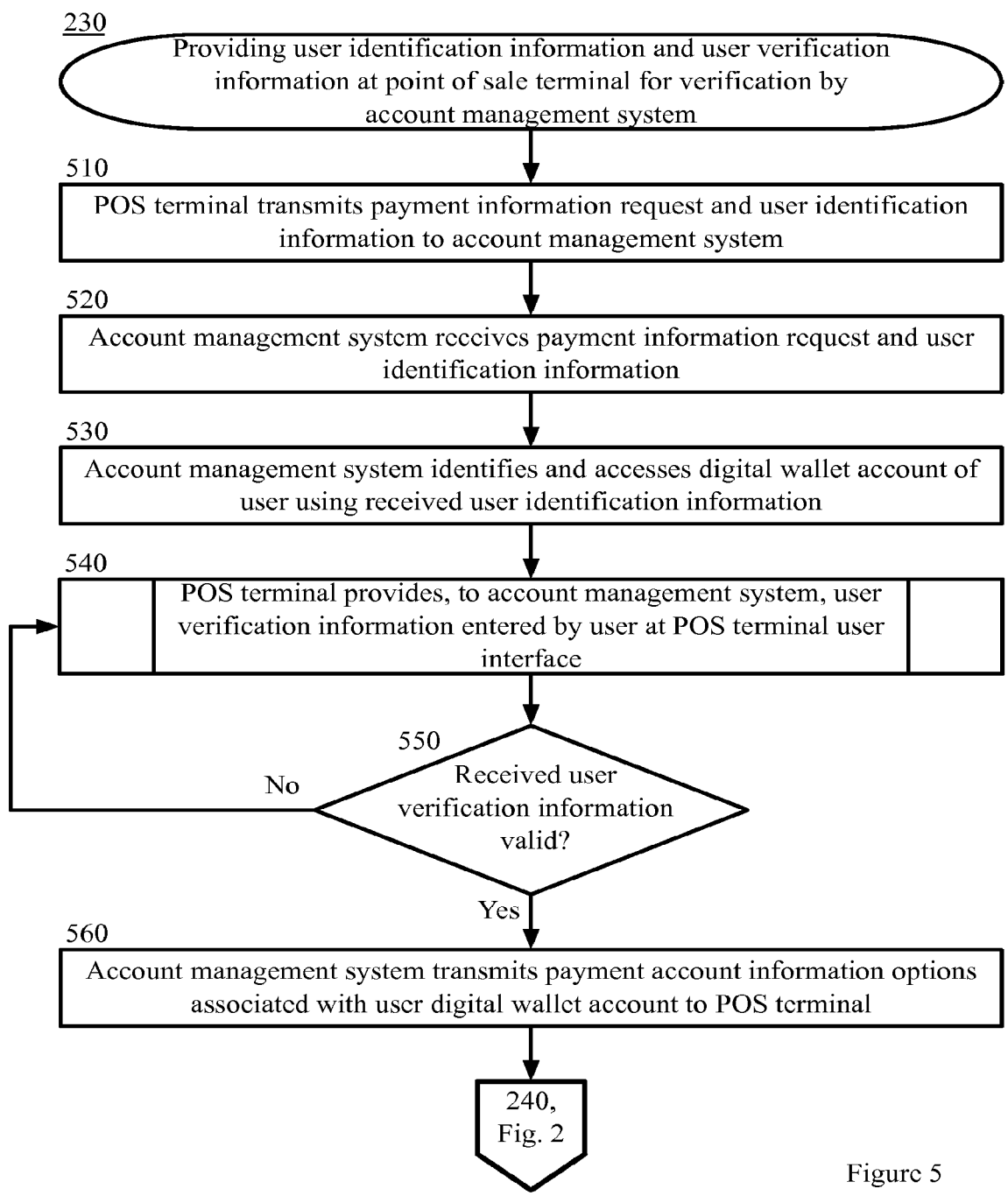
FIG. 5 is a block flow diagram depicting a method for providing user identification information and user verification information at a point of sale terminal for verification by an account management system, in accordance with certain example embodiments.

FIG. 5 is a block diagram depicting a method 230 for providing user 101 identification information and user 101 verification information at a point of sale terminal 123 for verification by an account management system 130, in accordance with certain example embodiments. The method 230 is described with reference to the components illustrated in FIG. 1.

In block 510, the POS terminal 123 transmits a payment information request and the user 101 identification information to the account management system 130. For example, the POS terminal 123 transmits the user 101 identification information received from the user 101 at the user interface 129 to the account management system 130.

In block 520, the account management system 130 receives the payment information request and the user 101 identification information.

In block 530, the account management system 130 identifies and accesses the digital wallet account of the user 101 using the received user 101 identification information. In an example embodiment, the account management system 130 comprises a database or table that correlates user 101 identification information with respective digital wallet account identifiers. In this example embodiment, the account management system 130 accesses the table or database, finds the entry corresponding to the received user 101 identification information, and identifies the digital wallet account of the user 101 associated with the user 101 identification information. For example, the account management system 130 receives a telephone number associated with the user's 101 digital wallet account and identifies the digital wallet account by looking up the telephone number in the table or database. In example embodiment, the user 101 identification information entered by the user 101 and received from the POS terminal 123 is identical to the user 101 identification information that the user 101 provided to the account management system 130 when establishing the digital wallet account. In this example embodiment, the account management system 130 should be able to identify the user's 101 digital wallet account based on the received user 101 identification information. In other example embodiments, the user 101 submits invalid or incorrect identification for which the account management system 130 is unable to find a corresponding digital wallet account via the table or database. In these example embodiments, the account management system 130 may transmit a notice to the POS terminal 123 that the user 101 identification information submitted by the user 101 is incorrect and a request for second user 101 identification information. The POS terminal 123 may display the notice of incorrect user 101 identification information and may display the request for second user 101 identification information. The user 101 may then enter second user 101 identification information that the POS terminal 123 may transmit to the account management system 130. In this example embodiment, the account management system 130 identifies the digital wallet account of the user 101 based on the second user 101 identification information.

In block 540, the POS terminal 123 provides, to the account management system 130, user 101 verification information entered by the user 101 at the POS terminal 123 user interface 129. In other example embodiments, the user 101 identification information comprises user 101 verification information and the user 101 does not have to separately submit verification information. For example, a user 101 fingerprint scan may comprise both user 101 identification information and user 101 verification information. In another example, the user 101 provides the user 101 verification information at the same time that the user 101 provides the user 101 identification information. In another example embodiment, the user 101 does not provide verification information to the POS terminal 123.

Figure 6:
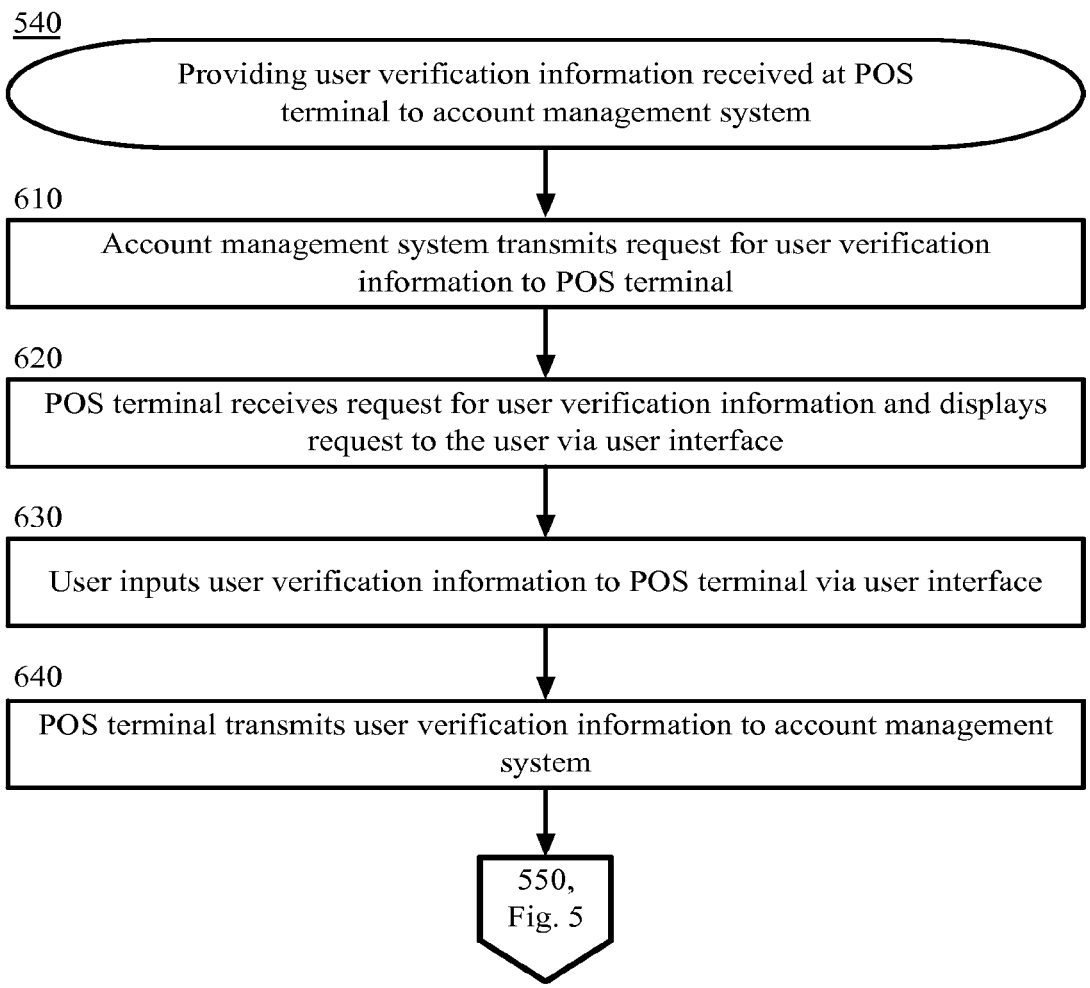
FIG. 6 is a block flow diagram depicting a method for providing user verification information received at a point of sale terminal to an account management system, in accordance with certain example embodiments.

FIG. 6 is a block diagram depicting a method 540 for providing user 101 verification information received at a POS terminal 123 to an account management system 130, in accordance with certain example embodiments. The method 540 is described with reference to the components illustrated in FIG. 1.

In block 610, the account management system 130 transmits a request for user 101 verification information to the POS terminal 123. In an example embodiment, the POS terminal 123 is configured to accept a certain type of user 101 verification information. For example, the POS terminal user interface 129 comprises a fingerprint scanner, a touch screen keyboard, an external keyboard, or other applicable user interface 129 that enables a user 101 to enter user 101 verification information.

In block 620, the POS terminal 123 receives the request for user 101 verification information and displays the request to the user 101 via the user interface 129. For example, the POS terminal 123 displays a message that reads, "Please provide your digital wallet account password using the keyboard."

In block 630, the user 101 inputs user 101 verification information to the POS terminal 123 via the user interface 129. For example, the user 101 enters a password, enters a PIN, selects an image from among a plurality of displayed images, undergoes a fingerprint scan, submits a voice recording, undergoes a retinal scan, or submits other appropriate user 101 verification information. In another example embodiment, the user 101 does not submit user 101 verification information to the POS terminal 123.

In block 640, the POS terminal 123 transmits the user 101 verification information to the account management system 130. For example, the POS terminal 123 transmits the user 101 verification information via the network 160 to the account management system 130. In an example embodiment, the account management system 130 receives the user 101 verification information.

From block 640, the method 540 proceeds to block 550 in FIG. 5.

Returning to FIG. 5, in block 550, the account management system 130 determines whether the received user 101 verification information is valid. In an example embodiment, the account management system 130 comprises a table or database that correlates user 101 verification information to user 101 identification information and/or user digital wallet account identifiers.

If the account management system 130 determines that the received user 101 verification information is invalid, the method 230 returns to block 540. In an example embodiment, the account management system 130 identified the digital wallet account of the user 101 based on the received user 101 identification information. In this example embodiment, the account management system 130 locates an entry in the database or table that correlates user 101 verification information to user 101 identification information and/or user digital wallet account identifiers. In this example embodiment, the account management system 130 compares the received user verification identification against the user 101 verification information associated with the user 101 identification information in the database or table. In this example embodiment, the account management system 130 determines that the received user 101 verification information is invalid if the received user 101 verification information does not match, exactly or within a predetermined margin of error, the user 101 verification information associated with the user's digital wallet account identifier and user identifying information stored in the table. For example, received user 101 verification information comprising a user 101 fingerprint scan is only 30% similar to a fingerprint scan associated with the user 101 digital wallet account. In this example, the account management system 130 requires that a received fingerprint scan have a 99% similarity to the fingerprint scan associated with the user's 101 digital wallet account to be considered valid user 101 verification information. In this example, the account management system 130 determines that the received user 101 verification information comprising the fingerprint scan is invalid user 101 verification information because the 30% similarity is below the required 99% threshold.

In block 540, the POS terminal 123 provides, to the account management system 130, user 101 verification information entered by the user 101 at the POS terminal 123. For example, the account management system 130 notifies the POS terminal 123 that the first user 101 verification information entered by the user is invalid. In this example, the POS terminal 123 displays a request for the user to re-enter user 101 verification information. In this example embodiment, the user 101 enters second user 101 verification information into the POS terminal 123, which communicates the second user 101 verification information to the account management system 130. In this example, the account management system 130 determines the validity of the second user 101 verification information according to the previously discussed method.

Returning to block 550, if the account management system 130 determines that the received user 101 verification information is valid, the method 230 proceeds to block 560. In an example embodiment, the account management system 130 identified the digital wallet account of the user 101 based on the received user 101 identification information. In this example embodiment, the account management system 130 locates an entry in the database or table that correlates user 101 verification information to user 101 identification information and/or user digital wallet account identifiers. In this example embodiment, the account management system 130 compares the received user verification identification against the user 101 verification information associated with the user 101 identification information in the database or table. In this example embodiment, the account management system 130 determines that the received user 101 verification information is valid if the received user 101 verification information matches, exactly or within a predetermined margin of error, the user 101 verification information associated with the user's digital wallet account identifier and user identifying information stored in the table. For example, the account management system 130 receives user 101 verification information comprising a password reading "george146!" and the user 101 verification information associated with the user's 101 digital wallet account and user 101 identification information in the table comprises a password reading "george146!" In this example, the account management system 130 determines that the received user 101 verification information is valid because the received password exactly matches the password associated with the user's 101 digital wallet account.

In block 560, the account management system 130 transmits payment account information options associated with the user 101 digital wallet account to the POS terminal 123. In an example embodiment, each payment information option corresponds to respective payment account information submitted by the user 101 to the digital wallet account. In an example embodiment, the account management system 130 may not transmit payment information options comprising complete payment information associated with respective payment accounts. For example, the account management system 130 may abbreviate, obfuscate, or occlude one or more parts of the payment account information associated with each payment option. For example, payment account information associated with a credit card may comprise "Issuer A credit card, 4565-9878-4855-1429, expiration date 11/13/17." In this example, the payment account information option transmitted by the account management system 130 to the POS terminal 123 may comprise "Issuer A credit card, xxxx-xxxx-xxxx-1429, expiration date 11/13/17." In this example, the account management system 130 has deleted the first twelve digits and represented them by an "x" in the payment account information option. In other example embodiments, the account management system 130 transmits payment account information options comprising payment account information for each payment account information option in its entirety.

From block 560, the method 230 proceeds to block 240 in FIG. 2.

Returning to FIG. 2, in block 240, the POS terminal 123 receives the payment account information options associated with the user 101 digital wallet account from the account management system 130.

In block 250, the user 101 selects a payment account information option associated with the user 101 digital wallet account via the POS terminal 123 user interface 129.

Figure 7:
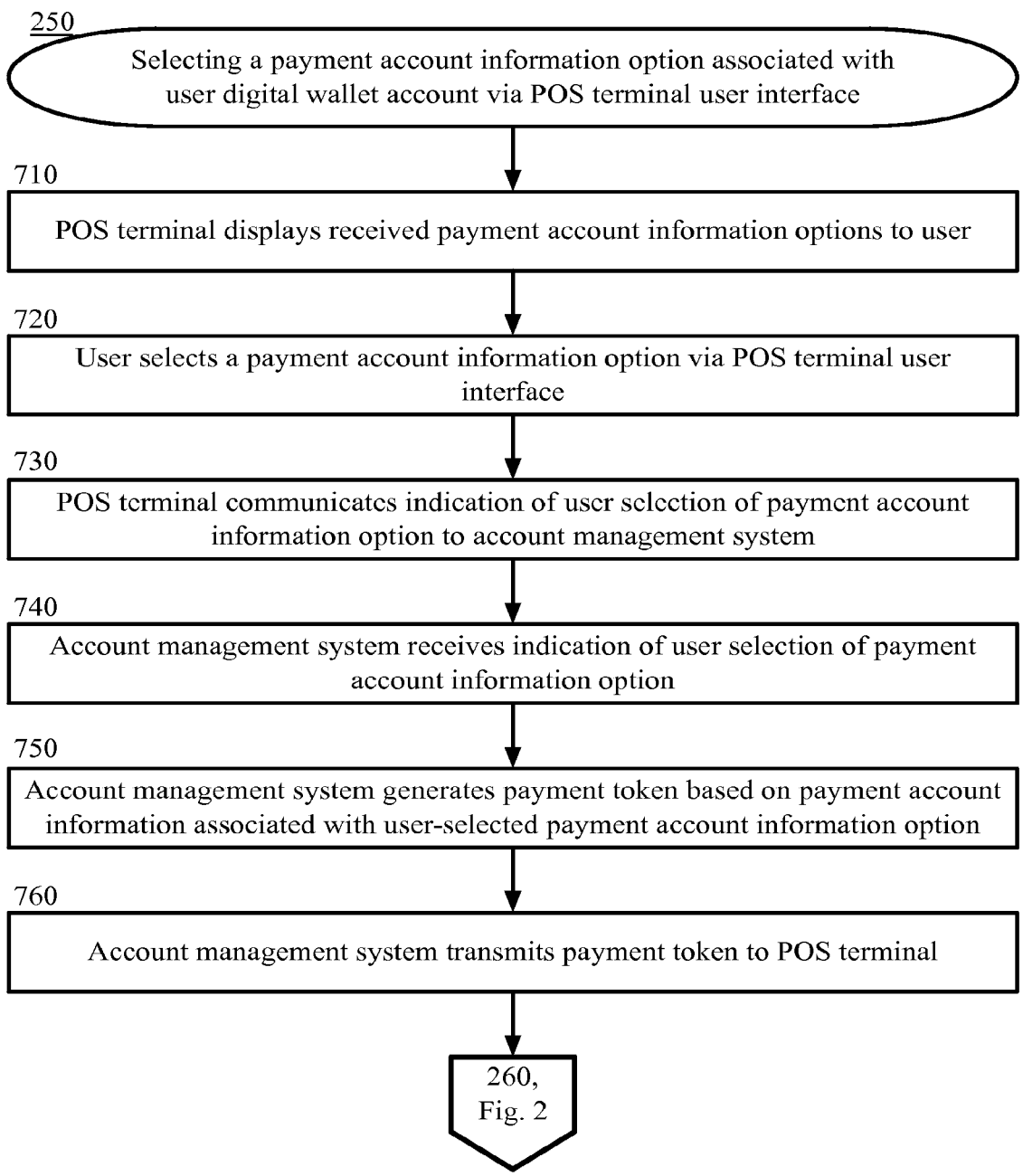
FIG. 7 is a block flow diagram depicting a method for selecting a payment account information option associated with a user digital wallet account via a point of sale terminal user interface, in accordance with certain example embodiments.

FIG. 7 is a block diagram depicting a method 250 for selecting a payment account information option associated with a user 101 digital wallet account via a POS terminal 123 user interface 129, in accordance with certain example embodiments. The method 540 is described with reference to the components illustrated in FIG. 1.

In block 710, the POS terminal 123 displays received payment account information options to the user 101. In an example embodiment, the POS terminal 123 displays one or more icons on the user interface 129 of the POS terminal 123, each icon corresponding to one of one or more received payment account information options. In an example embodiment, the payment account information options do not display complete payment account information. For example, payment account information for a credit card account comprises "Issuer A credit card, 9885-3440-0034-2906, expiration date—01/14/18." In this example, the displayed payment account information option corresponding to the payment account information may comprise "xxxx-xxxx-xxxx-2906, expiration date—01/14/18." In this example, the first twelve digits of the credit card number are not displayed to the user 101.

In block 720, the user 101 selects a payment account information option via the POS terminal 123 user interface 129. In an example embodiment, the user 101 actuates one or more objects on the user interface 129 of the POS terminal 123 to select a particular payment account information option. In another example embodiment, the user 101 selects two or more payment account information options via the user interface 129. For example, the user selects both a credit card and a coupon from among the displayed payment account information options to apply to the transaction.

In block 730, the POS terminal 123 communicates an indication of the user 101 selection of the payment account information option to the account management system 130. For example, the POS terminal 123 transmits the indication of the user 101 selection of the payment account information option comprising "Issuer A credit card, xxxx-xxxx-xxxx-2906, expiration date—01/14/18" over the network 160 to the account management system 130. In another example embodiment, the POS terminal 123 communicates an indication of the user 101 selection of two or more payment account information options to the account management system 130.

In block 740, the account management system 130 receives the indication of the user 101 selection of the payment account information option. In another example embodiment, the account management system 130 receives an indication of the user 101 selection of two or more payment account information options. In an example embodiment, for each particular selected payment account information option, the account management system 130 identifies corresponding payment account information. In an example embodiment, the account management system 130 comprises a table or database that correlates payment account information options to corresponding payment account information associated with a user's 101 digital wallet account. For example, a user 101 selected a payment account information option "Issuer A credit card, xxxx-xxxx-xxxx-2906, expiration date—01/14/18" that corresponds to payment account information comprising "Issuer A credit card, 9885-3440-0034-2906, expiration date—01/14/18." In this example, the account management system 130 receives the selection of the payment account information option, finds the payment account information option in the table or database, and identifies the payment account information associated in the table or database with the payment account information option.

In block 750, the account management system 130 generates a payment token based on the payment account information associated with the user-selected payment account information option. In an example embodiment, a payment token comprises information to be used by the POS terminal 123 necessary to process a transaction with an issuer system 150 associated with the payment account information. For example, the issuer system 150 may comprise a credit card issuer system 150, a banking institution issuer system 150, a coupon issuer system 150, a rewards card issuer system 150, or a merchant system 130. In an example embodiment, the payment token comprises part or all of the payment account information associated with the payment account information option selected by the user 101 via the POS terminal user interface 129 for use in the transaction. For example, the payment token may comprise a credit card number, an expiration date, and/or any other relevant payment information necessary to process a transaction. In another example, the payment token may comprise the same data that would be provided to a merchant system POS terminal 123 by a user if the user physically swiped or scanned a payment instrument associated with the payment account information option. In another example embodiment, the issuer system 150 stores complete payment account information for a payment account information option selected by the user 101. In this example embodiment, the payment token comprises data that can be correlated by the issuer system 150 to the payment account information stored by the issuer system 150. For example, the payment token may comprise a virtual credit number that, when received from the merchant system POS terminal 123, can be used by the issuer system 150 to identify a credit card account of the user 101. In another example embodiment, the account management system 130 generates two or more payment tokens corresponding to two or more respective payment account information options selected by the user 101 at the merchant system POS terminal user interface 129.

In block 760, the account management system 130 transmits the payment token to the POS terminal 123. For example, the account management system 130 transmits the payment token via the network 160 to the merchant system POS terminal 123. In another example embodiment, the account management system 130 transmits two or more payment tokens to the POS terminal 123.

From block 760, the method 250 proceeds to block 260 in FIG. 2.

Returning to FIG. 2, in block 260, the POS system receives a payment token from the account management system 130.

In block 270, the POS terminal 123 communicates with the issuer system 150 to process the transaction using the payment token. For example, the issuer system 150 may comprise a credit card issuer system 150, a bank issuer system 150, a coupon issuer system 150, or a merchant system 120 issuer system 150. In another example embodiment, the POS terminal 123 communicates with two or more issuer systems 150 to process the transaction using two or more payment tokens. For example, the POS terminal 123 communicates with a coupon issuer system 150 to process a first transaction using a first payment token comprising coupon payment account information and communicates with a credit card issuer system 150 to process a second transaction using a second payment token comprising credit card account information.

FIG. 8 is a block diagram depicting a method 270 for communicating with an issuer system 150 to process a transaction using a payment token, in accordance with certain example embodiments. The method 270 is described with reference to the components illustrated in FIG. 1. In certain example embodiments, the POS terminal 123 communicates separately with each of two or more issuer systems 150 to process two or more transactions using two or more respective payment tokens.

In block 810, the POS terminal 123 transmits the payment token and a payment authorization request to the issuer system 150. For example, the POS terminal 123 transmits the payment token and the payment authorization request via the network 160 to the issuer system 150. In an example embodiment, the payment authorization request comprises a transaction total, merchant system 120 payment account information, and/or other useful information used to process a payment transaction or reimburse the merchant system 120. In an example embodiment, the payment token comprises payment account information associated with a payment account of the user.

In block 820, the issuer system 150 receives the payment token and the payment authorization request.

In block 830, the issuer system 150 identifies a payment account associated with the payment token. In an example embodiment, the issuer system 150 extracts payment account information from the payment token. In another example embodiment, the issuer system 150 comprises a table or database that correlates payment tokens to corresponding payment accounts. In this example embodiment, the issuer system 150 searches for the payment token in the table or the database and identifies a payment account associated with the payment token using the table or database. For example, the payment token comprises a coupon code, the issuer system 150 is a coupon issuer system 150, and the coupon issuer system 150 comprises a table that correlates coupon codes to coupon accounts of the coupon issuer system 150. In this example, the coupon issuer system 150 searches for the coupon code in the table and identifies a corresponding coupon account of the coupon issuer system 150. In this example, this coupon account may be used to reimburse a merchant system 120 for the value of a coupon issuer system 150 coupon used in a transaction. In another example, the payment token comprises a credit card account number and the issuer system 150 is a credit card issuer system 150. In this example, the issuer system 150 identifies the user 101 payment account based on the received credit card account number. In yet another example, the payment token comprises a virtual credit card number. In this example, the issuer system 150 comprises a table that correlates virtual credit card numbers to user 101 credit payment accounts. In this example, the issuer system 150 may generate the virtual credit number for the user 101 to use instead of the true credit account number.

In block 840, the issuer system 150 determines whether to approve or to decline the payment transaction. In an example embodiment, a credit card issuer system 150 determines whether to approve or decline the payment transaction based on the user's 101 current balance, the user's 101 credit limit, and/or the amount of the current transaction. In another example embodiment, a coupon issuer system 150 determines whether to approve or decline the payment transaction based on the conditions imposed by a coupon being used in the transaction and transaction data received from the merchant system POS terminal 123.

If the issuer system 150 approves the payment transaction, the method 270 proceeds to block 860. For example, a credit card issuer system 150 approves the payment transaction because the user 101 credit limit and current credit balance are such that the current transaction amount will not cause the user's 101 credit balance to exceed the credit limit. In another example, a coupon issuer system 150 approves the payment transaction based on the data received from the merchant system POS terminal 123. In this example, the coupon issuer system 150 determines that the user 101 satisfies the coupon terms and conditions based on the data received from the merchant system POS terminal 123.

In block 860, the issuer system 150 transmits a notice of authorized payment transaction to the POS terminal 123. An example notice of authorized payment transaction may comprise a transaction number, a confirmation number, a transaction amount, a portion of the user account number used in the transaction, a time of transaction, and/or any other useful or relevant information to the transaction. In an example embodiment, the POS terminal 123 receives the notice of authorized payment transaction.

In block 870, the POS terminal 123 processes the transaction and generates a transaction receipt. In an example embodiment, the POS terminal 123 prints a paper transaction receipt at the POS terminal 123 via a printer resident on the POS terminal 123. In another example embodiment, the POS terminal 123 and/or the merchant system 120 transmits an electronic receipt to the user computing device 110 via email, text messaging, or other appropriate means. In an example embodiment, the transaction receipt communicates to the user 101 the transaction total and that the transaction was approved by the issuer system 150. In an example embodiment, the transaction receipt comprises a merchant system 120 name, an address of the physical location of the merchant system 120 at which the user 101 made the purchase, a transaction amount, a portion of the payment account number used in the transaction, the date of transaction, descriptions and/or prices of one or more items purchased in the transaction, and/or any other useful or relevant information associated with the transaction.

Returning to block 840, if the issuer system 150 declines the payment transaction, the method 270 proceeds to block 850. For example, a credit card issuer system 150 declines the payment transaction because the user 101 credit limit and current credit balance are such that the current transaction amount would cause the user's 101 credit balance to exceed the credit limit. In another example, a coupon issuer system 150 declines the payment transaction based on the data received from the merchant system POS terminal 123. In this example, the coupon issuer system 150 determines that the user 101 satisfies the coupon terms and conditions based on the data received from the merchant system POS terminal 123.

In block 850, the POS terminal 123 receives notice of a declined payment transaction. In an example embodiment, the issuer system 150 transmits the notice of a declined payment transaction to the POS terminal 123. An example notice of approved payment transaction may comprise a transaction number, a transaction amount, a portion of the user account number used in the transaction, a time of transaction, and/or any other useful or relevant information to the transaction.

In block 880, the POS terminal 123 generates a transaction receipt. In an example embodiment, the POS terminal 123 prints a paper transaction receipt at the POS terminal 123 via a printer resident on the POS terminal 123. In another example embodiment, the POS terminal 123 and/or the merchant system 120 transmits an electronic receipt to the user computing device 110 via email, text messaging, or other appropriate means. In an example embodiment, the transaction receipt communicates to the user 101 the transaction total and that the transaction was declined by the issuer system 150. In an example embodiment, the transaction receipt comprises a merchant system 120 name, an address of the physical location of the merchant system 120 at which the user 101 attempted to make the purchase, a transaction amount, a portion of the payment account number used in the attempted transaction, the date of the attempted transaction, descriptions and/or prices of one or more items that were intended to be purchased in the attempted transaction, and/or any other useful or relevant information associated with the declined transaction.

From block 880, the method 270 proceeds to block 280 in FIG. 2.

Returning to FIG. 2, in block 280, the user 101 receives the transaction receipt. For example, the POS terminal 123 prints the transaction receipt and the user 101 receives the receipt at the POS terminal 123. In another example, the POS terminal 123 sends an email or text message to the user 101 comprising the transaction receipt, which the user receives via the user computing device.

Other Example Embodiments

Figure 9:
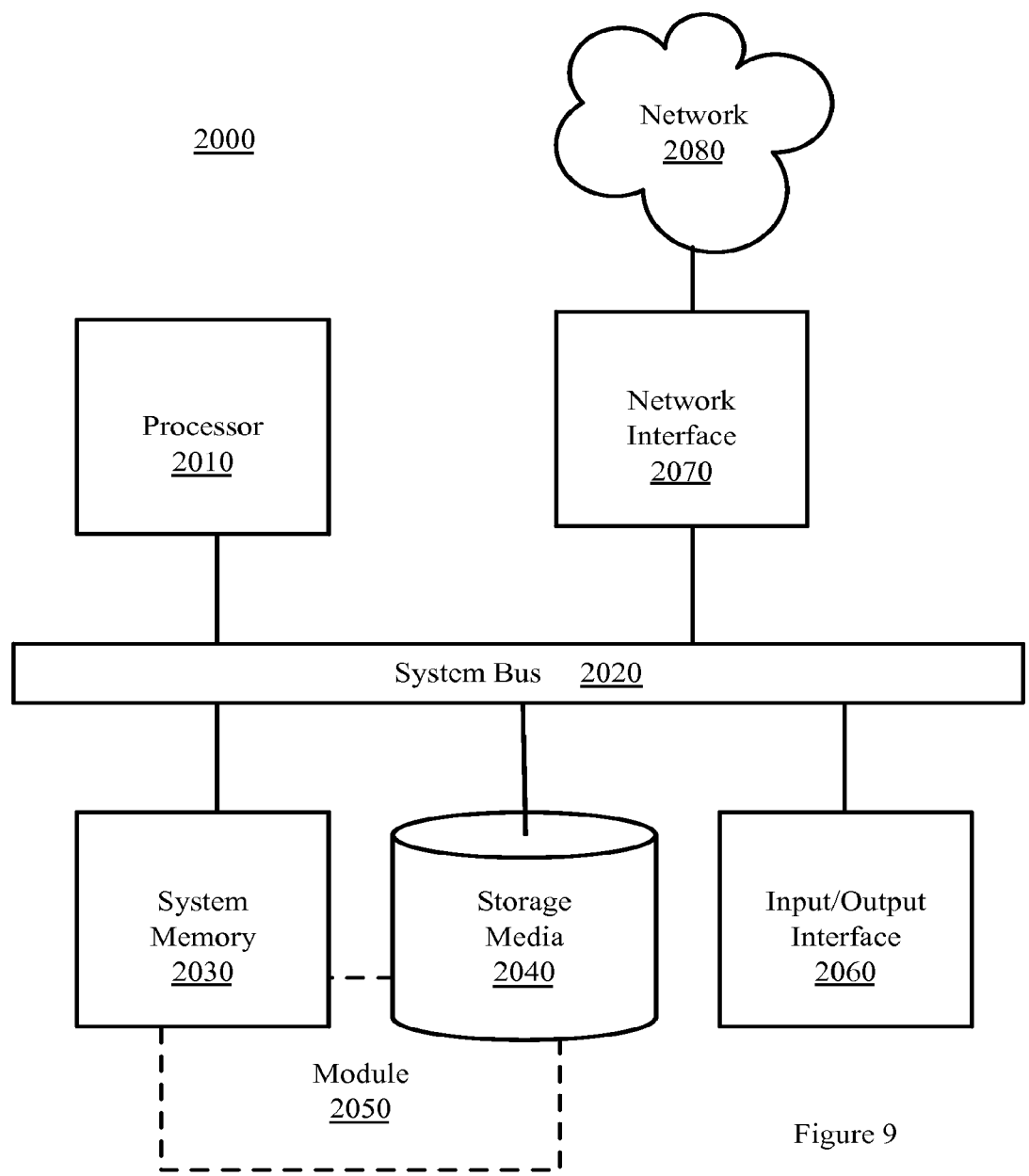
FIG. 9 is a block diagram depicting a computing machine and module, in accordance with certain example embodiments.

FIG. 9 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The L/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM. ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to process a transaction via digital wallet payment account information of a user at a point of sale computing device of a merchant computing system, comprising:

receiving, by one or more computing devices and from a point of sale computing device associated with a merchant computing system, user identification information associated with a user and a request for payment account information associated with a digital wallet account of the user;

identifying, by the one or more computing devices, the digital wallet account of the user based on the user identification information;

retrieving, by the one or more computing devices, one or more payment account options associated with the digital wallet account of the user;

transmitting, by the one or more computing devices and to the point of sale computing device, the one or more payment account options for presentation by the point of sale computing device;

receiving, by the one or more computing devices and from the point of sale computing device, an indication of a selection at the point of sale computing device of a particular payment account option from the one or more payment account options;

generating, by the one or more computing devices, a payment token based on payment account information associated with the particular payment account option; and transmitting, by the one or more computing devices, the payment token to the point of sale computing device for the point of sale computing device to process a payment transaction using the particular payment account option based on an issuer computing system associated with information in the payment token.

2. The method of claim 1, further comprising:

at a time after identifying the digital wallet account of the user and at a time before transmitting the one or more payment account options, accessing, by the one or more computing devices, first user verification information associated with the digital wallet account;

transmitting, by the one or more computing devices and to the point of sale computing device, a request for user verification information to be displayed on the point of sale computing device;

receiving, by the one or more computing devices and from the point of sale computing device, second user verification information entered at the point of sale computing device; and determining, by the one or more computing devices, that the second user verification information matches the first user verification information, and wherein transmitting the one or more payment account options is performed in response to determining that the second user verification information matches the first user verification information.

3. The method of claim 2, wherein the first and second user verification information comprise one or more of biometric information associated with the user, a personal identification number, and a password.

4. The method of claim 1, wherein the user identification information comprises an account number, a telephone number, an email address, or a hardware identifier associated with a computing device of the user in proximity to the point of sale computing device.

5. The method of claim 1, wherein the one or more payment account options transmitted to the point of sale computing device comprise payment account information that is abbreviated or occluded.

6. The method of claim 1, wherein the one or more payment account options comprise one or more of a credit account, a debit account, a bank account, a coupon, a rewards points account, a voucher, and an account associated with the merchant computing system.

7. A computer-implemented method to process a transaction via digital wallet payment account information of a user at a point of sale computing device of a merchant computing system, comprising;

receiving, by a point of sale computing device associated with a merchant computing system, an input of a request to process a transaction using payment information from a digital wallet account of a user;

receiving, by the point of sale computing device, user identification information;

transmitting, by the point of sale computing device and to one or more computing devices associated with the digital wallet account of the user, the user identification information and a request for payment account information associated with the digital wallet account of the user;

receiving, by the point of sale computing device and from the one or more computing devices, one or more payment account options associated with the digital wallet account of the user;

displaying, by the point of sale computing device, the one or more payment account options;

receiving, by the point of sale computing device, an indication of a selection of a particular payment account option from the one or more payment account options displayed via the point of sale computing system;

transmitting, by the point of sale computing device and to the one or more computing devices, the indication of the selection of the particular payment account option;

receiving, by the point of sale computing device and from the one or more computing devices, a payment token associated with the particular payment account option;

communicating, by the point of sale computing device and to an issuer computing system associated with the particular payment account option, a transaction authorization request and the payment token to process a payment transaction;

receiving, by the point of sale computing device and from the issuer computing system, an authorization of the transaction authorization request based on the particular payment account option; and completing, by the point of sale computing device, the transaction based on the authorization.

8. The method of claim 7, wherein the one or more payment account options comprise one or more of a credit account, a debit account, a bank account, a coupon, a rewards points account, a voucher, and an account associated with the merchant computing system.

9. The method of claim 7, further comprising:

at a time before receiving the one or more payment account options, receiving, by the point of sale computing device and from the one or more computing devices, a request for user verification information associated with the digital wallet account of the user;

displaying, by the point of sale computing device, the request for user verification information;

receiving, by the point of sale computing device, user verification information; and transmitting, by the point of sale computing device and to the one or more computing devices, the user verification information, wherein the one or more computing devices verify the user verification information transmitted against user verification information stored in association with the digital wallet account of the user, and wherein receiving the one or more payment account options from the one or more computing devices is in response to the one or more computing devices verifying the user verification information.

10. The method of claim 9, wherein the user verification information comprises biometric information, a password, or a personal identification number.

11. The method of claim 7, wherein receiving the user identification information comprises:

establishing, by the point of sale computing device and with a user computing device in proximity to the point of sale computing device, a network connection;

transmitting, by the point of sale computing device and to the user computing device, a request for hardware identifier associated with the user computing device; and receiving, by the point of sale computing device and from the user computing device, a hardware identifier, wherein the user identification information transmitted to the one or more computing devices comprises at least the hardware identifier.

12. The method of claim 7, wherein receiving the user identification information comprises:

displaying, by the point of sale computing device, a request for user identification information; and receiving, by the point of sale computing device, user identification information entered via a user interface associated with the point of sale computing device.

13. A computer program product, comprising:

a non-transitory computer-readable medium having computer-readable program instructions embodied thereon that when executed by a computer cause the computer to provide digital wallet payment account information of a user to a point of sale computing device of a merchant computing system, the computer-readable program instructions comprising:

computer-readable program instructions to receive, from a point of sale computing device associated with a merchant computing system, user identification information associated with a user and a request for payment account information associated with a digital wallet account of the user;

computer-readable program instructions to identify the digital wallet account of the user based on the user identification information;

computer-readable program instructions to retrieve one or more payment account options associated with the digital wallet account of the user;

computer-readable program instructions to transmit, to the point of sale computing device, the one or more payment account options for presentation by point of sale computing device;

computer-readable program instructions to receive, from the point of sale computing device, an indication of a selection at the point of sale computing device of a particular payment account option from the one or more payment account options;

computer-readable program instructions to generate, a payment token based on payment account information associated with the particular payment account option; and computer-readable program instructions to transmit, to the point of sale computing device, the payment token, wherein the point of sale computing device communicates the payment token to an issuer computing system associated with the payment account information to process a payment transaction using the particular payment account option.

14. The computer program product of claim 13, further comprising:

computer-readable program instructions to access, at a time after identifying the digital wallet account of the user and at a time before transmitting the one or more payment account options, first user verification information associated with the digital wallet account;

computer-readable program instructions to, to the point of sale computing device, a request for user verification information to be displayed on the point of sale computing device;

computer-readable program instructions to receive, from the point of sale computing device, second user verification information entered at the point of sale computing device; and computer-readable program instructions to determine that the second user verification information matches the first user verification information, and wherein transmitting the one or more payment account options is performed in response to determining that the second user verification information matches the first user verification information.

* * * * *